United States Patent [19]

Kato

[11] Patent Number: 4,576,861

[45] Date of Patent: Mar. 18, 1986

[54] MATERIAL FOR GASEOUS DIFFUSION ELECTRODE

[75] Inventor: Hiroshi Kato, Wake, Japan

[73] Assignee: Junkosha Co. Ltd., Tokyo, Japan

[21] Appl. No.: 696,312

[22] Filed: Jan. 30, 1985

[30] Foreign Application Priority Data

Feb. 27, 1984 [JP] Japan ................. 59-34427

[51] Int. Cl.$^4$ .......................... B32B 3/26; B32B 5/30; B32B 5/32

[52] U.S. Cl. .................... 428/316.6; 264/127; 428/315.5; 428/317.9; 428/422

[58] Field of Search ............ 264/127; 428/308.4, 428/315.5, 315.7, 315.9, 316.6, 422, 317.9

[56] References Cited

U.S. PATENT DOCUMENTS

| | | | |
|---|---|---|---|
| 3,953,566 | 4/1976 | Gore | 428/422 |
| 4,385,093 | 5/1983 | Hubis | 428/422 |
| 4,386,987 | 6/1983 | Covitch et al. | 428/308.4 |
| 4,539,256 | 9/1985 | Shipman | 428/315.5 |

Primary Examiner—William J. Van Balen
Attorney, Agent, or Firm—Mortenson & Uebler

[57] ABSTRACT

A material for use as a gaseous diffusion electrode is provided. The material has improved durability resulting in long life. the material comprises a composite of a first layer of polytetrafluoroethylene (PTFE) containing a filler of a powdered electroconductive substance and a second layer of PTFE in bonded laminar contact with the first layer. The second layer preferably contains no electroconductive filler. The first and second layers are bonded together under pressure to form an intermediate composite and this intermediate composite is stretched, to produce the material of the invention which is a composite layered product of expanded PTFE having nodes interconnected by fibrils, one layer containing electroconductive material and the second layer preferably containing no electroconductive material. A catalytic substance can be incorporated onto or into at least the first layer by either deposition or by a filler of catalytic powder for use as the gas diffusing electrode of the invention.

10 Claims, No Drawings

MATERIAL FOR GASEOUS DIFFUSION ELECTRODE

BACKGROUND OF THE INVENTION

This invention relates to a material for use as a gas diffusing electrode for electrolytic cells, and, more particularly, to a composite material intended for gas diffusing electrodes to be used in batteries such as fuel cells and oxygen-metal cells e.g. a zinc-air battery, and in sodium chloride electrolytic cells and other electrochemical mechanisms and retains its waterproof characteristic for a long time. This invention, thus, is aimed at providing a material for gas diffusing electrodes excelling in durability.

In a gas diffusing electrode which is used in a fuel cell, or other similar electrochemical device, there is formed a three-phase boundary of gas, electrolyte, and catalyst. For a galvanic reaction to proceed, it is necessary that the boundary between the gas and the electrolyte be formed within the electrode and the electrolyte should be prevented from leaking through to the gas side. For the purpose of fulfilling this requirement, an electrode formed by combining a powdered, electroconductive substance containing therein, or not containing therein, a catalytic substance, together with polytetrafluoroethylene resin has been proposed. The polytetrafluoroethylene is a highly water-repellent substance. When this resin is molded into a properly porous structure, it can prevent leakage of the electrolyte and enhance the properties of the fuel cell, for example. The electrode produced as described does not retain its waterproofness for a long time, however. It inevitably suffers from degradation of properties after some thousands of hours' operation.

To solve this problem, it has been proposed to dispose on the gas chamber side a waterproofing layer formed of a porous sheet of such a waterrepellent synthetic resin as expanded polytetrafluoroethylene. This device has provided a considerable improvement. A material suitable for similar applications, obtainable inexpensively and easily, and being excellent in strength and performance is disclosed in Japanese Patent Application Laid-open SHO (1982) No. 30270, for example, filed by the inventors herein. This is a material for gas diffusing electrodes and it is a wholly microporous structure comprising a multiplicity of nodes of polytetrafluoroethylene resin containing a powdered electroconductive substance and a multiplicity of minute fibers of polytetrafluoroethylene resin extending from the aforementioned nodes so as to interconnect the nodes three-dimensionally, with part of the minute nodes bordering one another or continuing into one another. The node-fibril structure of expanded PTFE is shown schematically and described in U.S. Pat. No. 3,953,566. Even in the electrode using this material, particularly when the powdered electroconductive substance is contained therein in a large percentage, it suffers from leakage of the electrolyte after a protracted operation. To solve this drawback, incorporation of a waterproof layer of expanded PTFE has been tried. In this case, simple application of pressure and heat does not suffice for the added layer to be bound having sufficient adhesive strength to hold the layers together. The added layer, if bound at all, therefore, entails the problem of layer separation unless an adhesive agent is interposed between the two layers so bound. In the case of such union of two layers as involved here, it is extremely difficult to apply any adhesive layer uniformly at the interface. If the amount of the adhesive agent is increased, or the pressure applied for the union is increased to obtain sufficient adhesive strength, the fine pores distributed in the aforementioned microstructure are clogged so much as to impair the perviousness of the material to gas. Consequently, the properties inherent in the electrode are not obtained. Otherwise, this action can induct layer separation. At any rate, this measure fails to give a desired product.

SUMMARY OF THE INVENTION

A composite material for use as a gas diffusing electrode is provided preferabaly comprising a first layer comprising a sheet of expanded, porous PTFE having nodes interconnected by fibrils and having an initial thickness, this first layer containing a powdered, electroconductive substance therein, and a second layer comprising a sheet of pure, expanded, porous PTFE having nodes interconnected by fibrils and having an initial thickness, the second layer being bonded to and integrated with the first layer, the thickness of the composite material being less than the combined initial thicknesses of the first and second layers, a portion of the nodes and fibrils of the first and second layers being interconnected and intertwined to form the bond between the layers. The first layer of the composite comprises 30% to 95% by weight of the powdered, electroconductive substance and 5% to 70% by weight of PTFE. The powdered, electroconductive substance is preferably powdered carbon. The first layer preferably contains a catalytic substance. Also provided is the method of making a layered composite material for use as a gas diffusing electrode comprising the steps of:

(a) blending together a finely powdered PTFE, a powdered electroconductive substance and a liquid lubricant to form a pasty blend, (b) compressing, extruding and rolling the pasty blend to form a sheet of PTFE containing the substance and lubricant, to be used as a first basic layer of the composite, the first layer having an initial thickness, (c) superimposing on the first layer a second layer comprising a sheet of pure, porous PTFE having an initial thickness, (d) compressing the total thickness of the superimposed layers to a thickness less than the combined initial thicknesses of the first and second layers, to form an intermediate composite, (e) removing the liquid lubricant from the intermediate composite, and (f) stretching the intermediate composite formed in step "e" to form the composite for use as a gas diffusing electrode. The second layer may comprise a sheet formed by compressing, extruding and rolling a pasty blend of PTFE fine powder and a liquid lubricant to form a sheet of PTFE containing liquid lubricant, followed by removal of the lubricant, or it may be a sheet of pure, expanded, porous PTFE.

DETAILED DESCRIPTION OF THE INVENTION AND PREFERRED EMBODIMENTS WITH REFERENCE TO THE DRAWINGS

A material for use as a gaseous diffusion electrode is provided. The material has improved durability resulting in long life. The material comprises a composite of a first layer of polytetrafluoroethylene (PTFE) containing a filler of a powdered electroconductive substance and a second layer of PTFE in bonded laminar contact with the first layer. The second layer preferably contains no electroconductive filler. The first and second layers are bonded together under pressure to form an intermediate composite and this intermediate composite is stretched, to produce the material of the invention which is a composite layered product of expanded PTFE having nodes interconnected by fibrils, one layer containing electroconductive material and the second layer preferably containing no electroconductive material. A catalytic substance can be incorporated onto or into at least the first layer by either deposition or by a filler of catalytic powder for use as the gas diffusing electrode of the invention.

A sheet to be used as an intermediate material in the composite of this invention is prepared from a pasty blend of the basic components according to conventional techniques, i.e., finely powdered polytetrafluoroethylene resin, powdered electroconductive substance, and liquid lubricant are blended together to form a pasty blend, and the pasty blend is subjected to compression, extrusion, and rolling as disclosed in the aforementioned Japanese patent Application SHO No. 57(1982)-30270, to form the extruded sheet of PTFE containing filler and lubricant to be used as one basic material for the composite of this invention. In this case, the powdered electroconductive substance is incorporated into the blend in a proportion of not less than 30% by weight and not more than 95% by weight, based on total solids present. If the proportion is less than 30% by weight, sufficient electroconductivity or reaction area is not obtained. If the proportion exceeds 95% by weight, the strength of the sheet is notably lowered and moldability is degraded. Separately, a second sheet obtained as above by preparing a pasty blend of the basic components, i.e., finely powdered polytetrafluoroethylene and liquid lubricant but no conductive filler, is prepared and this pasty blend is subjected to compression, extrusion and rolling, to form the sheet to be used as another basic material of the invention. Alternatively, a sheet prepared as above from which the liquid lubricant has been removed can be used as such other basic material of the invention.

The material according to this invention for use as a gas diffusing electrode is obtained by superimposing the first basic material on either of the second basic materials described above, adjusting the combined thickness of the resultant superimposed layers by pressure, such as by passing the superimposed layers through compression rollers, thereby integrating and bonding the two layers to form an intermediate composite, subsequently removing the liquid lubricant from the bonded intermediate composite, and finally stretching this composite. The material so obtained may be treated with heat at 100° to 370° C., for example. Optionally, it may be further compressed under varying pressure in the range of 5 to 1000 kg/cm$^2$. Of course, the heat treatment and the compression (for adjustment of wall thickness) may be carried out simultaneously.

In a third embodiment of this invention, the material for the gas diffusing electrode is obtained by preparing the aforementioned other basic material in the form of a prestretched porous, expanded, unsintered film of polytetrafluoroethylene as discussed in U.S. Pat. No. 3,953,566, superimposing this film on the first basic sheet containing filler and lubricant, and adjusting the wall thickness of the superimposed layers under pressure, thereby integrating and bonding the two layers, subsequently removing the liquid lubricant, and thereafter subjecting the material so obtained to a stretching treatment. The material so obtained may be further subjected to a heat treatment or further compression treatment. Optionally, these treatments may be carried out simultaneously as in the preceding embodiment.

In the material of this invention described above, owing to the adjustment of the combined wall thickness of the two basic materials in their superimposed state, the electroconductive and/or the catalytic layer and the diffusing layer are integrated with each other and, at the same time, they are compressed to a prescribed thickness and converted into a prescribed microstructure. Thus, they are joined to each other in a thoroughly intertwined state and are retained in stable union without requiring the use of any special adhesive agent. This material, therefore, provides advantageous electrode properties and long service life.

This material is easy to produce. When the layers superimposed as described above contain therein carbon black, or other similar powdered electroconductive substance, the adjustment of the combined wall thickness of the layers results in an alteration in the degree of proximity or the degree of contact of adjacent particles of the electroconductive substance so as to increase electroconductivity of this substance. The sheet material of this invention is a porous membrane and has therein a multiplicity of voids lacking carbon particles and, therefore, has a smaller content of carbon per unit volume than for a non-porous membrane. When this sheet material undergoes the adjustment of the combined wall thickness of the superimposed layers, the electroconductivity of the material itself can be enhanced. The aforementioned carbon particles are more likely to be concentrated n the nodes. When the material is stretched to more than twice the original length, these nodes may be disconnected (mainly in the direction of stretch) or may be connected or held in mutual contact meagerly. By the adjustment of the wall thickness, therefore, sufficient electrical contact between adjacent nodes can be ensured. If the ratio of this stretching is lowered, the material fails to acquire good physical properties required of a sheet and the nodes are too large to permit sufficient dispersion of carbon. Thus, the properties of the material so produced would prove undesirable for an electrode. By faithfully observing the procedures described herein, these problems can be advantageously solved.

With the adjustment of the wall thickness followed by the removal of the liquid lubricant contained in at least one of the two basic layers, the cohesive effect consequently brought about enables the integration and bonding of the two basic layers to be obtained efficiently and thoroughly. When the unsintered, expanded PTFE film is adopted as the other basic material, the adjustment of the wall thickness enables the first basic material to find its way into the pores of the other basic materials and this produces a mutual anchoring effect. Thus, the integration of the two basic layers can be carried out more effectively. The adjustment of the wall thickness causes further compression of the other porous basic layer. As a result, the basic layer destined to constitute the diffusing layer is given a reduced wall thickness and an increased density of texture. The composite material finally obtained, therefore, offers less resistance to gas passage without impairing the waterproofness of the material.

Working examples of the production of the material of this invention follow.

EXAMPLE 1

A blend consisting of 20% by weight of polytetrafluoroethylene dispersion powder and 80% by weight of electroconductive carbon black powder (acetylene black) was prepared by the conventional co-coagulation method. Then a pasty blend was prepared by mixing 100 parts by weight of the aforementioned blend with 180 parts by weight of liquid lubricant (petroleum naphtha).

This pasty blend was subjected to conventional compression, extrusion, and rolling to produce a ribbon-shaped sheet 0.25 mm in thickness and 150 mm in width, to be used as a first basic material.

Separately, finely powdered polytetrafluoroethylene and liquid lubricant were mixed in respective proportions of 82% by weight and 18% by weight. The resultant blend was extruded by a conventional method to produce the second basic material 0.08 mm in thickness and 150 mm in width.

The two basic materials obtained as described above were superimposed, then subjected to adjustment of wall thickness, and consequent integration, by passage through the nip between pressure rolls, to afford a composite, laminated sheet 0.15 mm in thickness. Subsequently, this lamined sheet was heated at 200° C. for a time sufficient to expel the liquid lubricant by vaporization. This intermediate composite was then stretched in an atmosphere kept at 200° C. in the direction of its width to the extent of three times the original width. Consequently, there was obtained a material measuring 0.13 mm in thickness and having a Gurley number of 25 seconds. This material was usable as a gas diffusing electrode as contemplated by the present invention. A microscopic observation of the cross section of this sheet revealed that the layer containing carbon black and polytetrafluoroethylene, destined to serve as a catalytic layer, had a thickness of 0.1 mm and the layer comprising solely polytetrafluoroethylene, destined to serve as a gas diffusing layer, had a thickness of 0.03 mm.

The sheet so obtained was pressed at a pressure of 50 kg/cm² with a press, then heated at 350° C. for 10 minutes, immersed in isopropyl alcohol and water, in the order mentioned, to impregnate the sheet with water, heated in nitric acid at 90° C. for three hours, washed with water by decantation, left standing in an aqueous platinic chloride solution for two days, and heated under a current of hydrogen at 200° C. for 30 minutes, in order to deposit a platinum catalyst coating thereon. By applying a porous nickel collector through the medium of FEP adhesive to this catalyst layer, there was obtained an oxygen cathode. When common salt was electrolyzed by the ion-exchange membrane method using this oxygen cathode under the conditions of 200 mA/cm², 30% NaOH, and 80° C., the initial voltage was 2.5 V and this value was substantially unchanged after 2000 hours of continued operation. The cathode was observed to entail absolutely no leakage of water.

EXAMPLE 2

A blend of 20% by weight of powdered polytetrafluoroethylene and 80% by weight of carbon black carrying 10% by weight of powdered platinum catalyst was prepared by the co-coagulation method. A pasty blend was prepared by mixing 100 parts by weight of the aforementioned blend with 170 parts by weight of a liquid lubricant. This pasty blend was subjected to conventional compression, extrusion, and rolling to provide a ribbon-shaped sheet 0.30 mm in thickness and 150 mm in width.

Separately, an unsintered film of expanded, porous polytetrafluoroethylene measuring 16 μm in thickness and having a density of 0.24 g/cm³, a Gurley number of 1.6 seconds, and a maximum pore diameter of 0.4 μm was prepared. This film was superimposed on the ribbon-shaped sheet and the thickness of the superimposed sheets were adjusted to a total composite thickness of 0.15 mm and joined integrally. Then this intermediate composite was stretched in the direction of its width to four times the original width and, with its four sides thereof fixed in place, subjected to vacuum drying at 200° C. to remove the lubricant. Consequently, there was obtained a material composed of a catalyst layer 90 μm in thickness and a gas diffusing layer 3 μm in thickness and having a Gurley number of 9 seconds, useful as a gas diffusing electrode contemplated by this invention.

A gas diffusing electrode was formed by joining a porous nickel sheet to the catalyst layer side of the aforementioned material under the pressure of 50 kg/cm², 300° C., and 10 minutes, using as a binder a mixture consisting of 50 parts by weight of FEP and 50 parts by weight of polytetrafluoroethylene. When the electrolysis of common salt was conducted by following the procedure of Example 1 and using this gas diffusing electrode as an oxygen cathode, the initial voltage was 2.3 V. This value was substantially unchanged even after 1800 hours of continued operation. The cathode was observed to entail absolutely no leakage of water.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A composite material for use as a gas diffusing electrode comprising:
   (a) a first layer comprising a sheet of expanded, porous PTFE having nodes interconnected by fibrils and having an initial thickness, said first layer containing a powdered, electroconductive substance therein, and
   (b) a second layer comprising a sheet of pure, expanded, porous PTFE having nodes interconnected by fibrils and having an initial thickness,
   said second layer being more highly porous than said first layer and being bonded to and integrated with said first layer, the thickness of said composite material being less than the combined initial thicknesses of said first and second layers, a portion of said nodes and fibrils of said first and second layers being interconnected and intertwined to form said bond between the layers.

2. The material of claim 1 wherein said first layer comprises 30% to 95% by weight of said powdered, electroconductive substance and 5% to 70% by weight of PTFE.

3. The material of claim 1 wherein said powdered, electroconductive substance is powdered carbon.

4. The material of claim 1 wherein said first layer contains a catalytic substance.

5. The composite material of claim 1 wherein said second layer contains a powdered, electroconductive substance therein.

6. The method of making a layered composite material for use as a gas diffusing electrode comprising the steps of:
  (a) blending together a finely powdered PTFE, a powdered electroconductive substance and a liquid lubricant to form a pasty blend,
  (b) compressing, extruding and rolling said pasty blend to form a sheet of PTFE containing said substance and lubricant, to be used as a first basic layer of said composite, said first layer having an initial thickness,
  (c) superimposing on said first layer a second layer comprising a sheet of pure, expanded porous PTFE, with or without lubricant and having a higher porosity than said first layer, having an initial thickness,
  (d) compressing the total thickness of said superimposed layers to a thickness less than the combined initial thicknesses of said first and second layers, to form an intermediate composite,
  (e) removing said liquid lubricant from said intermediate composite, and
  (f) stretching said intermediate composite to form said composite for use as a gas diffusing electrode.

7. The process of claim 6 wherein said first layer comprises 30% to 95% by weight of said powdered, electroconductive substance and 5% to 70% by weight of PTFE.

8. The process of claim 6 wherein said powdered, electroconductive substance is powdered carbon.

9. The process of claim 6 comprising applying a catalytic substance to at least said first layer.

10. The process of claim 6 wherein said second layer contains a powdered, electroconductive substance therein.

* * * * *